US009060135B2

(12) United States Patent
Akiba

(10) Patent No.: US 9,060,135 B2
(45) Date of Patent: Jun. 16, 2015

(54) CONTROL OF EXPOSURE OF CAMERA

(71) Applicant: DENSO CORPORATION, Kariya, Aichi-pref. (JP)

(72) Inventor: Kazuyoshi Akiba, Nagoya (JP)

(73) Assignee: DENSO CORPORATION, Kariya, Aichi-pref.

( * ) Notice: Subject to any disclaimer, the term of this patent is extended or adjusted under 35 U.S.C. 154(b) by 0 days.

(21) Appl. No.: 14/160,907

(22) Filed: Jan. 22, 2014

(65) Prior Publication Data

US 2014/0204267 A1    Jul. 24, 2014

(30) Foreign Application Priority Data

Jan. 23, 2013    (JP) ................................. 2013-010417

(51) Int. Cl.
*G03B 7/00* (2014.01)
*H04N 5/235* (2006.01)
*H04N 7/18* (2006.01)

(52) U.S. Cl.
CPC .................................. *H04N 5/2353* (2013.01)

(58) Field of Classification Search
CPC ... H04N 5/235; H04N 5/2351; H04N 5/2353; H04N 5/243; H04N 5/351; G06T 2210/21; G06T 2207/30248–2207/30268; B60R 2300/00–2300/108
USPC ............................. 348/148, 221.1, 229.1, 362
See application file for complete search history.

(56) References Cited

U.S. PATENT DOCUMENTS

| 2004/0227814 | A1* | 11/2004 | Choi | 348/148 |
| 2008/0055424 | A1* | 3/2008 | Jerdev | 348/222.1 |
| 2009/0174809 | A1* | 7/2009 | Mochida et al. | 348/362 |
| 2010/0033619 | A1 | 2/2010 | Kimura | |

FOREIGN PATENT DOCUMENTS

| JP | 09-142210 | 6/1997 |
| JP | 2010-041668 | 2/2010 |

OTHER PUBLICATIONS

Office Action dated Jan. 6, 2015 in corresponding Japanese Application No. 2013-010417.

* cited by examiner

*Primary Examiner* — Lin Ye
*Assistant Examiner* — Chriss Yoder, III
(74) *Attorney, Agent, or Firm* — Harness, Dickey & Pierce, P.L.C.

(57) ABSTRACT

A device for controlling exposure of a camera is provided. An image of an area ahead of a vehicle is acquired by a camera provided in the vehicle. A traveling speed of the vehicle is acquired. An exposure area in the acquired image is set by a setting section, in which the exposure area is used for exposure control of the camera. By a calculating section, a control value for performing the exposure control is calculated based on pixel values of pixels included in the exposure area. The setting section changes a size of the exposure area based on the traveling speed, such that, when the traveling speed is a first speed, the size of the exposure area in the acquired image is smaller compared to that when the traveling speed is a second speed that is lower than the first speed.

18 Claims, 7 Drawing Sheets

CONTROL OF EXPOSURE OF CAMERA

CROSS-REFERENCE TO RELATED APPLICATION

This application is based on and claims the benefit of priority from earlier Japanese Patent Application No. 2013-10417 filed Jan. 23, 2013, the description of which is incorporated herein by reference.

BACKGROUND OF THE INVENTION

1. Field of the Invention

The present invention relates to controlling exposure control of a camera based on images captured by the camera, and in particular, to controlling the exposure of a camera mounted in a vehicle.

2. Description of the Related Art

A technology is known in which exposure control of a camera that is installed in a vehicle is performed based on an image captured by the camera. For example, JP-A-2010-041668 discloses a technology in which a camera captures an image at an initial exposure. An adaptive exposure is then set based on the image captured at the initial exposure.

Specifically, a plurality of areas for exposure control are set in advance in the image captured at the initial exposure. An average luminance is detected for each of the areas. For each area, whether or not the area is an area (unsuitable area) in which edge components are assumed to be undetectable is judged based on the average luminance of the area. The edge components are undetectable due to excessive or insufficient exposure. When judged that any of the areas is an unsuitable area, the exposure of the camera is set to the adaptive exposure. The adaptive exposure is based on the average luminance of the unsuitable area.

As described above, a technology is known in which exposure control of a camera is performed based on the average luminance of an area for exposure control that is set in advance in an image captured by the camera. However, the appropriate manner of determining the area for exposure control in the captured image may differ depending on travel conditions of the vehicle and the like.

SUMMARY

Hence, it is desired to provide a technology for setting an area for exposure control depending on travel conditions of a vehicle.

An exposure control device according to an exemplary embodiment includes an image acquiring means, a speed acquiring means, a setting means, and a calculating means.

The image acquiring means acquires an image of an area ahead of a vehicle that is captured by a camera. The speed acquiring means acquires a traveling speed of the vehicle. The setting means sets an exposure area that is an area used for exposure control in the captured image. The calculating means calculates a control value for performing exposure control of the camera, based on pixel values of pixels included in the exposure area.

Specifically, the setting means changes a size of the exposure area in the captured image based on the traveling speed, such that, when the traveling speed is a first speed, the size of the exposure area in the captured image is smaller compared to that when the traveling speed is a second speed that is lower than the first speed.

As a result of the above-described configuration, an exposure area having a size suitable for the traveling speed of the vehicle can be set. In other words, a collision margin time TTC (time-to-collision) becomes shorter as the traveling speed increases. The collision margin time TTC refers to the amount of time until collision with an obstacle, when the vehicle travels while maintaining a certain traveling speed. In other words, with reference to a certain collision margin time TTC, the distance to the subject obstacle becomes farther as the traveling speed increases. Therefore, in a situation in which the traveling speed is high, compared to a situation in which the traveling speed is low, importance is required to be placed on detection of a target at a far distance. In the present embodiment, the exposure area in the captured image is set to a smaller size when the traveling speed is higher. Therefore, importance can be placed on detection of targets at far distances.

Reference numbers in the parentheses in this section and the scope of claims indicate an example of correlation with the specific means described in an embodiment, described hereafter. The references numbers do not limit the technical scope of the present embodiment.

In addition, the present embodiment can be actualized as various aspects in addition to the above-described exposure control device. For example, the present embodiment can be actualized as a vehicle control system in which the exposure control device is a constituent element, a program enabling a computer to function as the exposure control device, a recording medium on which the program is recorded, or an exposure control method.

DETAILED DESCRIPTION OF THE PREFERRED EMBODIMENTS

An embodiment to which the present invention is applied will hereinafter be described with reference to the drawings.

1. Configuration

Figure 1:
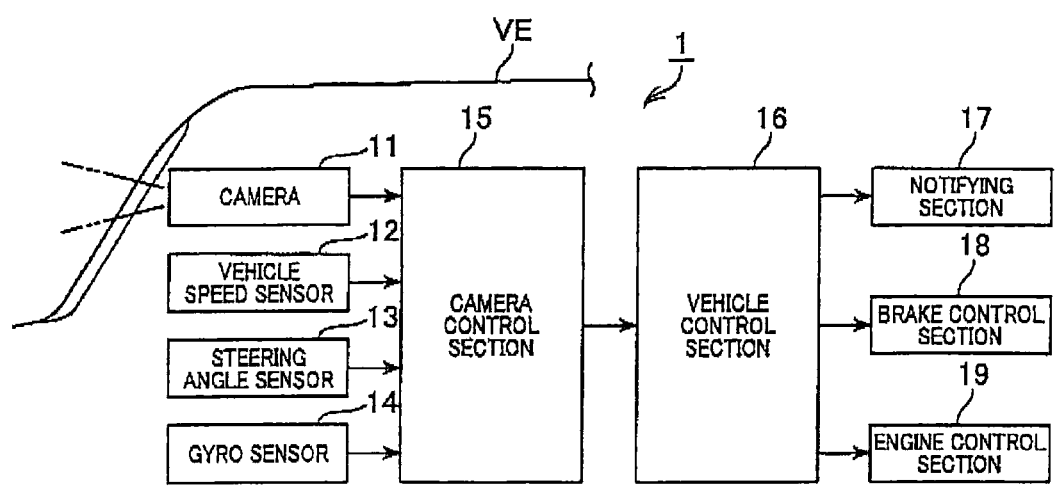
FIG. 1 is a block diagram of a configuration of a vehicle control system.

A vehicle control system 1 shown in FIG. 1 is mounted in a vehicle VE. The vehicle control system 1 includes a camera 11, a vehicle speed sensor 12, a steering angle sensor 13, a gyro sensor 14, a camera control section 15, a vehicle control section 16, a notifying section 17, a brake control section 18, and an engine control section 19.

In the vehicle control system 1, the camera control section 15 is capable of communicating with the camera 11, the vehicle speed sensor 12, the steering angle sensor 13, the gyro sensor 14, and the vehicle control section 16. In addition, in the vehicle control system 1, the vehicle control section 16 is capable of communicating with the camera control section 15, the notifying section 17, the brake control section 18, and the engine control section 19. The means for actualizing communication between constituent elements in the vehicle control system 1 is not particularly limited.

The camera 11 is attached such as to capture an image of an area ahead of an own vehicle VE (the vehicle in which the vehicle control system 1 is mounted) from the center of the front side of the own vehicle VE. The camera 11 transmits image data (captured images of the area ahead of the own vehicle VE) to the camera control section 15.

The vehicle speed sensor 12 transmits detection information (information indicating the vehicle speed at the time of detection) to the camera control section 15.

The steering angle sensor 13 detects a steering angle of a steering wheel of the own vehicle VE. The steering angle sensor 13 transmits detection information (information indicating the steering angle at the time of detection) to the camera control section 15.

The gyro sensor 14 detects a pitch angle (road gradient of a road on which the own vehicle VE is traveling). The pitch angle indicates a tilt in a front/back direction of the own vehicle VE in relation to a horizontal plane. The gyro sensor 14 transmits detection information (information related to the pitch angle at the time of detection) to the camera control section 15.

The camera control section 15 is an electronic control device that performs exposure control of the camera 11, target detection based on an image captured by the camera 11, and the like. The camera control section 15 includes a central processing unit (CPU), a read-only memory (ROM), a random access memory (RAM), and the like.

The vehicle control section 16 is an electronic control device that performs vehicle control, such as notification control, brake control, and engine control. The vehicle control section 16 includes a CPU, a ROM, a RAM, and the like.

The notifying section 17 performs notification to a driver of the own vehicle VE using sound, light, and the like when a warning signal is received from the vehicle control section 16.

The brake control section 18 is an electronic control device that controls braking of the own vehicle VE. The brake control section 18 includes a CPU, a ROM, a RAM, and the like. Specifically, the brake control section 18 controls a brake ACT based on a detection value from a sensor. The sensor detects a pressing amount of a brake pedal. The brake ACT is an actuator that opens and closes a pressure-increase control valve and a pressure-decrease control valve that are provided in a brake hydraulic circuit. In addition, the brake control section 18 controls the brake ACT such as to increase the braking force of the own vehicle VE in adherence to an instruction from the vehicle control section 16.

The engine control section 19 is an electronic control device that controls start/stop of an engine, fuel injection amount, ignition timing, and the like. The engine control section 19 includes a CPU, a ROM, a RAM, and the like. Specifically, the engine control section 19 controls a throttle ACT based on detection values from a sensor. The sensor detects a pressing amount of an accelerator pedal. The throttle ACT is an actuator that opens and closes a throttle that is provided in an intake pipe. In addition, the engine control section 19 controls the throttle ACT such as to reduce driving force of an internal combustion engine in adherence to an instruction from the vehicle control section 16.

2. Processes

Figure 2:
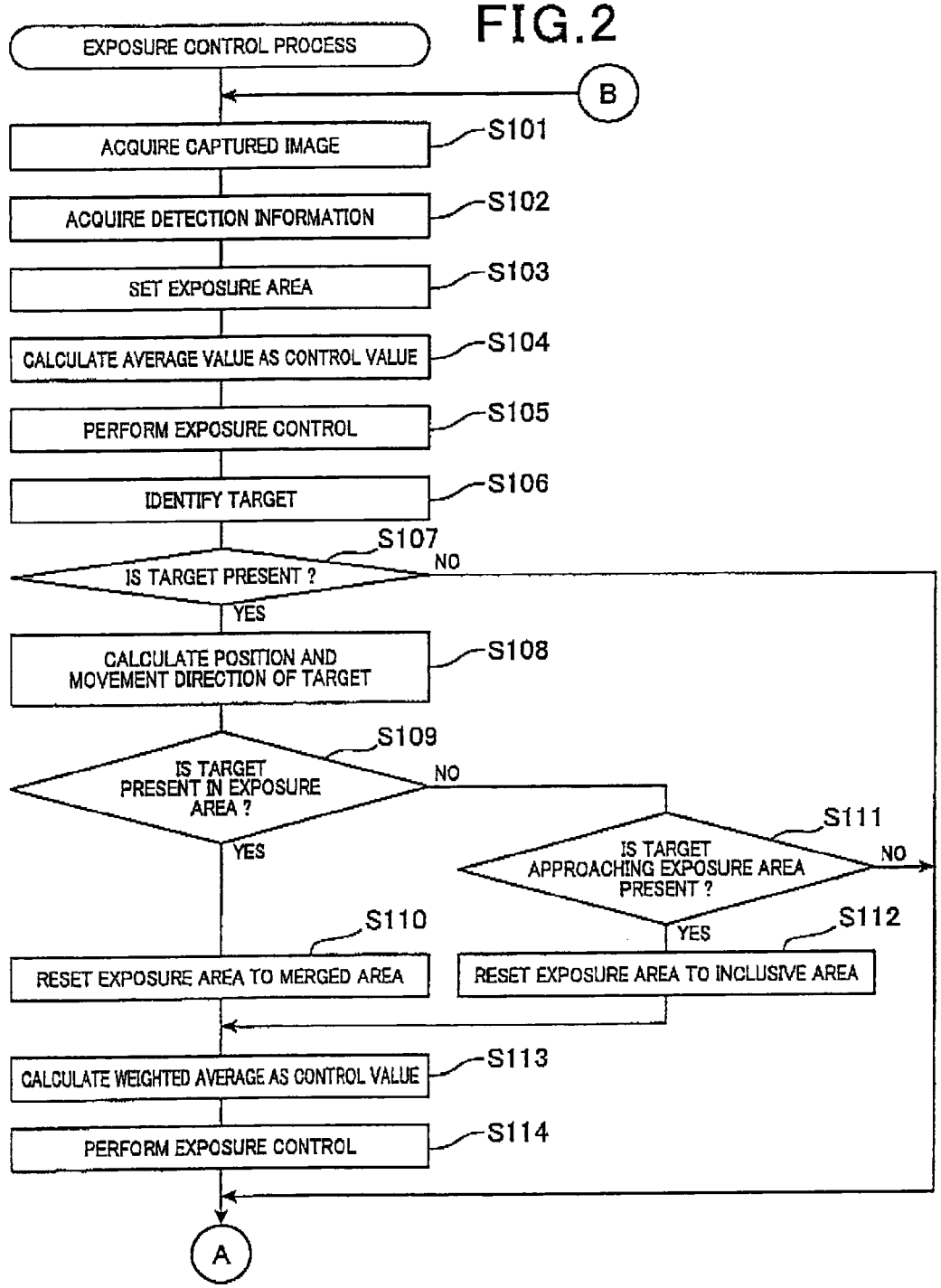
FIG. 2 is a flowchart (1) of an exposure control process.
Figure 3:
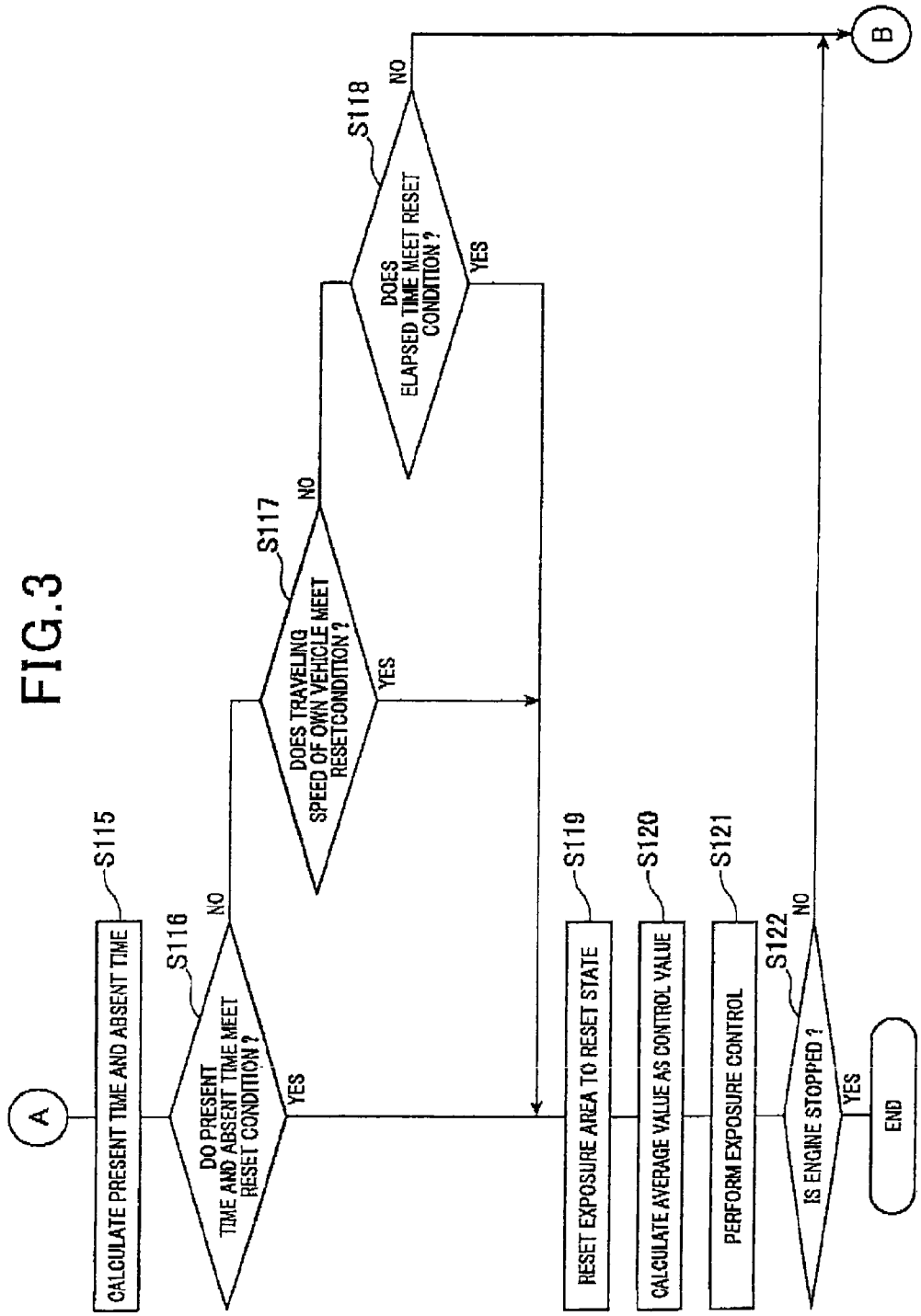
FIG. 3 is a flowchart (2) of the exposure control process.

Next, a method for controlling exposure of the camera 11 performed by the camera control section 15 will be described. The camera control section 15 has a storage section (such as a ROM). The storage section stores therein an exposure control program for actualizing exposure control of the camera 11. The camera control section 15 (specifically the CPU) performs an exposure control process based on the exposure control program. The exposure control process will hereinafter be described with reference to the flowcharts in FIG. 2 and FIG. 3. The start of the exposure control process shown in FIG. 2 and FIG. 3 is triggered by the start of the engine of the own vehicle.

First, the camera control section 15 acquires image data (a captured image of the area ahead of the own vehicle) from the camera 11 (step S101).

Then, the camera control section 15 acquires respective detection information (traveling speed, steering angle, and pitch angle of the own vehicle) from the vehicle speed sensor 12, the steering angle sensor 13, and the gyro sensor 14 (step S102).

Figure 4:
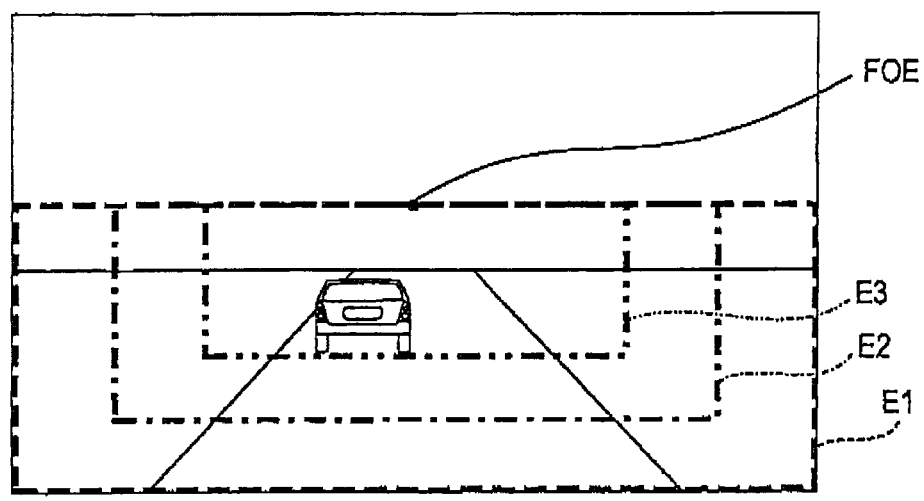
FIG. 4 is a diagram of exposure areas based on traveling speed in a captured image.

Next, the camera control section 15 sets an exposure area in the captured image acquired at step S101 (step S103). The exposure area is an area used for exposure control. Examples of an exposure area in a captured image are shown in FIG. 4. FIG. 4 shows three exposure areas E1, E2, and E3. The exposure area E1 (the area enclosed by dotted lines) has a first size. The exposure area E1 is a rectangular area having the largest size. In the example in FIG. 4, the exposure area E1 occupies the overall lower area of the captured image. The exposure area E2 has a second size (the area enclosed by dashed lines). The exposure area E2 is a rectangular area that is smaller than the exposure area E1 having the first size. In the example in FIG. 4, the exposure area E2 is included in the exposure area E1. The exposure area E3 has a third size (the area enclosed by double-dot chain lines). The exposure area E3 is a rectangular area that is smaller than the exposure area E2 having the second size. In the example in FIG. 4, the exposure area E3 is included in the exposure area E2. In FIG. 4, the three exposure areas E1, E2, and E3 are shown in a single captured image to facilitate comparisons of size and position. However, the three exposure areas E1, E2, and E3 are not set at the same time, but rather, are selectively set.

Specifically, the size and the position of the exposure area in the captured image change based on the traveling speed, the steering angle, and a change amount $\Delta\theta$ of the pitch angle of the own vehicle.

First, as a reference position of the exposure area, a position in a state in which the steering angle and the change amount $\Delta\theta$ of the pitch angle are 0 degrees will be described. In a state in which the steering angle is 0 degrees, the steering wheel is not operated in either the leftward or rightward direction (straight-ahead traveling state). In addition, in a state in which the change amount $\Delta\theta$ of the pitch angle is 0 degrees, for example, the tilt in the front/back direction of the own vehicle (the road gradient of the road on which the own vehicle is traveling) is 0 degrees. In other words, the own vehicle is in a level state. However, this is not limited thereto. For example, in an instance in which the own vehicle and a leading vehicle are present on a slope having the same tilt, the pitch angle of the slope may serve as reference.

As shown in FIG. 4, the position of the exposure area in a state in which the steering angle and the change amount $\Delta\theta$ of the pitch angle are 0 degrees is set to a position in which a focus of expansion (FOE) of the camera 11 is at the center of the upper side of the rectangle. The size of the exposure area is selected based on the traveling speed.

Specifically, for example, when the traveling speed is 0 or greater and less than V1, the exposure area E1 having the first size is selected. When the traveling speed is V1 or greater and less than V2 (V1<V2), the exposure area E2 having the second size is selected. When the traveling speed is V2 or greater, the exposure area E3 having the third size is selected. In other words, the size of the exposure area is set to become smaller as the traveling speed increases. In other words, as the traveling speed increases, detection at a position away from the own vehicle becomes important. Here, an example is given in which the size of the exposure area is changed between three stages. However, this is not limited thereto. The size of the exposure area may be changed between two stages, or four or more stages.

Figure 5:
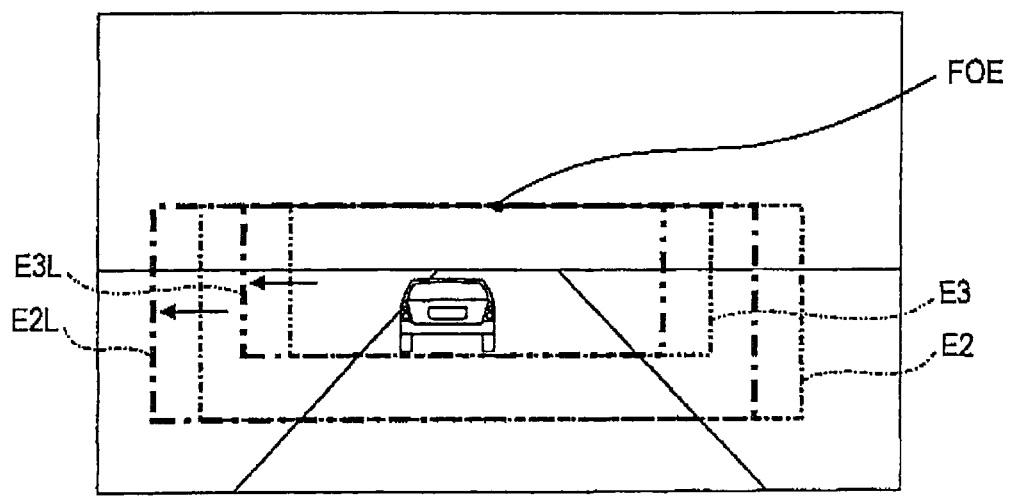
FIG. 5 is a diagram of exposure areas based on steering angle in a captured image.

Next, the position of the exposure area in a lateral direction in the captured image based on the steering angle will be described. As shown in FIG. 5, when the steering angle increases to the left side (the direction for turning left), the position of the exposure area in the lateral direction in the captured image (FIG. 5 shows exposure areas E2L and so E3L) is shifted to the left side in relation to the reference position (the exposure areas E2 and E3 in FIG. 4; indicated by fine lines in FIG. 5). In the example in FIG. 5, the exposure area E2L is shifted to the left side in relation to the exposure area E2 that is in the reference position. The exposure area E3L is shifted to the left side in relation to the exposure area E3 that is in the reference position. On the other hand, when the steering angle increases to the right side (the direction for turning right), the position of the exposure area in the lateral direction in the captured image shifts to the right side in relation to the reference position (not shown).

Specifically, for example, when the steering angle to the left side or the right side is 0 or more and less than $S\theta1$, a first shift amount is selected. In other words, the exposure area is set to a position that is shifted in the lateral direction by the first shift amount in relation to the reference position. When the steering angle to the left side or the right side is $S\theta1$ or more and less than $S\theta2$ ($S\theta1<S\theta2$), a second shift amount that is greater than the first shift amount is selected. When the steering angle to the left side or the right side is $S\theta2$ or more, a third shift amount that is greater than the second shift amount is selected. In other words, the position of the exposure area in the lateral direction is set to a position further shifted from the reference position as the steering angle increases. In other words, detection in the traveling direction of the own vehicle becomes important. Here, an example is shown in which the shift amount of the exposure area is changed between three stages. However, this is not limited thereto. The shift amount may be changed between two stages, or four or more stages.

Figure 6:
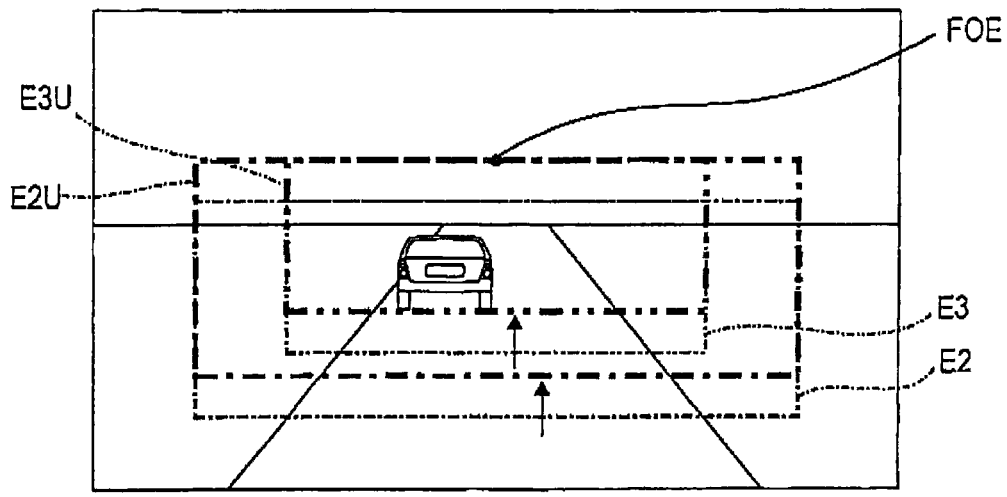
FIG. 6 is a diagram of exposure areas based on pitch angle in a captured image.

Next, a position of the exposure area in a vertical direction in the captured image based on the change amount $\Delta\theta$ of the pitch angle will be described. As shown in FIG. 6, when the change amount $\Delta\theta$ of the pitch angle increases to the forward upward side (uphill direction), the position of the exposure area in the vertical direction in the captured image (FIG. 6 shows exposure areas E2U and E3U) is shifted upwards in relation to the reference position (the exposure areas E2 and E3 in FIG. 4; indicated by fine lines in FIG. 6). In the example in FIG. 6, the exposure area E2U is shifted upwards in relation to the exposure area E2 that is in the reference position. The exposure area E3U is shifted upwards in relation to the exposure area E3 that is in the reference position. On the other hand, when the change amount $\Delta\theta$ of the pitch angle increases to the forward downward side (downhill direction), the position of the exposure area in the vertical direction in the captured image shifts downward in relation to the reference position (not shown).

Specifically, for example, when the change amount $\Delta\theta$ of the pitch angle to the forward upward side or the forward downward side is 0 or more and less than $P\theta1$, a first shift amount is selected. In other words, the exposure area is set to a position that is shifted upwards or downwards by the first shift amount in relation to the reference position. When the change amount $\Delta\theta$ of the pitch angle to the forward upward side or the forward downward side is $P\theta1$ or more and less than $P\theta2$ ($P\theta1<P\theta2$), a second shift amount that is greater than the first shift amount is selected. When the change amount $\Delta\theta$ of the pitch angle to the forward upward side or the forward downward side is $P\theta2$ or more, a third shift amount that is greater than the second shift amount is selected. In other words, the position of the exposure area in the vertical direction is set to a position further shifted from the reference position as the change amount $\Delta\theta$ of the pitch angle increases. In other words, detection in the traveling direction of the own vehicle becomes important. Here, an example is shown in which the shift amount of the exposure area is changed between three stages. However, this is not limited thereto. The shift amount may be changed between two stages, or four or more stages.

Next, the camera control section 15 calculates a control value for performing exposure control of the camera 11 (step S104). The camera control section 15 calculates the control value based on pixel values of the pixels included in the exposure area set at step S103. Specifically, the camera control section 15 calculates an average value (a value indicating the brightness of the exposure area) of the pixel values (luminance values) of all pixels included in the exposure area as the control value. Instead of all pixels, some pixels may be extracted as representative pixels. The average value of the extracted representative pixels may be calculated as the control value. The representative pixels may be selected based on positions in the exposure area (for example, such that the extraction positions are not biased). Alternatively, the representative pixels may be selected based on color components (for example, pixels of a certain color component among a plurality of color components). The same applies to steps S113 and S120, described hereafter.

Next, the camera control section 15 performs exposure control of the camera 11 based on the control value calculated at step S104 (step S105). As a result, exposure is adjusted such as to be suitable for imaging the exposure area set in the captured image.

Figure 7:
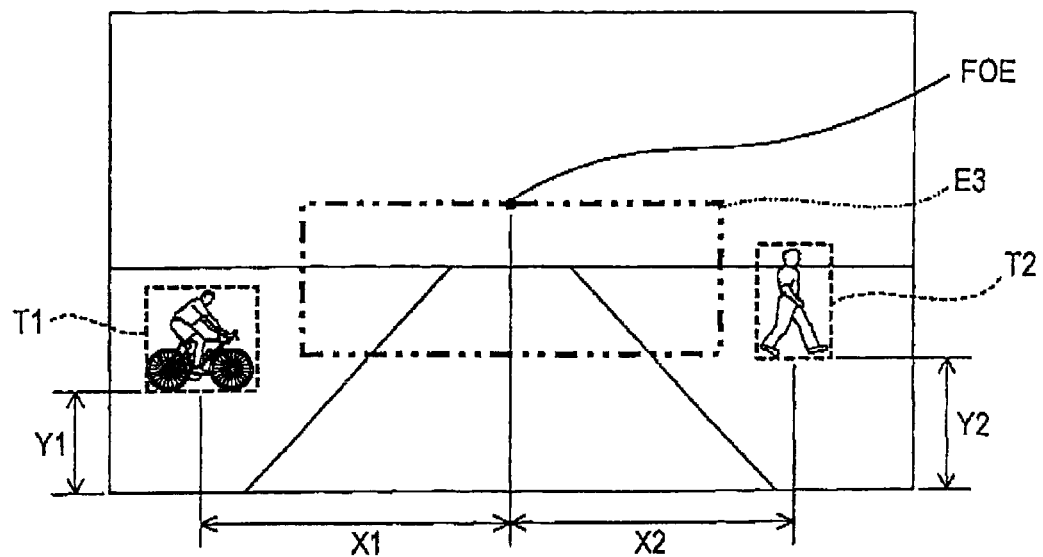
FIG. 7 is a diagram of target areas in a captured image.

Next, the camera control section 15 acquires a captured image captured after the exposure control is performed at step S105. The camera control section 15 analyzes the captured image and identifies targets (according to the present embodiment, mobile objects, such as pedestrians, bicycles, motorcycles, and vehicles) (step S106). Identification of the targets is performed, for example, by a matching process using target models that are registered in advance. As shown in FIG. 7, the identified targets are specified in the captured image as rectangular target areas (target areas T1 and T2 in the example in FIG. 7).

Next, the camera control section 15 judges whether or not a target is present in the captured image (whether or not a target is identified at step S106) (step S107). When judged that a target is identified (YES at step S107), the camera control section 15 calculates the position and the movement direction of the target (step S108).

The position of the target (relative position to the own vehicle) can be calculated from the position of the target area in the captured image. In other words, a lower end position of the target area in the captured image tends to become higher as the position of the target becomes farther in the direction ahead of the own vehicle. In the example in FIG. 7, a lower end position Y1 of the target area T1 is positioned lower than a lower end position Y2 of the target area T2. The target area T1 is detected to be present in a position closer to the own vehicle than the target area T2. In this way, the distance to the target in the direction ahead of the own vehicle can be specified based on the height of the lower end position of the target area in the captured image.

In addition, a shifting of the target area in the left/right direction (specifically, a vertical line passing through the center of the target area) with reference to the FOE in the captured image tends to increase as a shifting (shift in the lateral direction) of the target in an angular direction (horizontal orientation direction) with reference to the direction ahead of the own vehicle increases. In the example in FIG. 7, a shift amount X1 of the target area T1 in the leftward direction is greater than a shift amount X2 of the target area T2 in the rightward direction. The shifting of the target area T1 in the angular direction with reference to the direction ahead of the own vehicle is detected to be greater than that of the target area T2. In this way, the horizontal orientation position of the target can be specified based on the distance from the FOE to the vertical line passing through the center of the target area in the captured image. In addition, the camera control section 15 calculates the movement direction of the target based on changes over time in the position of the target (displacement between images captured at a predetermined cycle).

Figure 8:
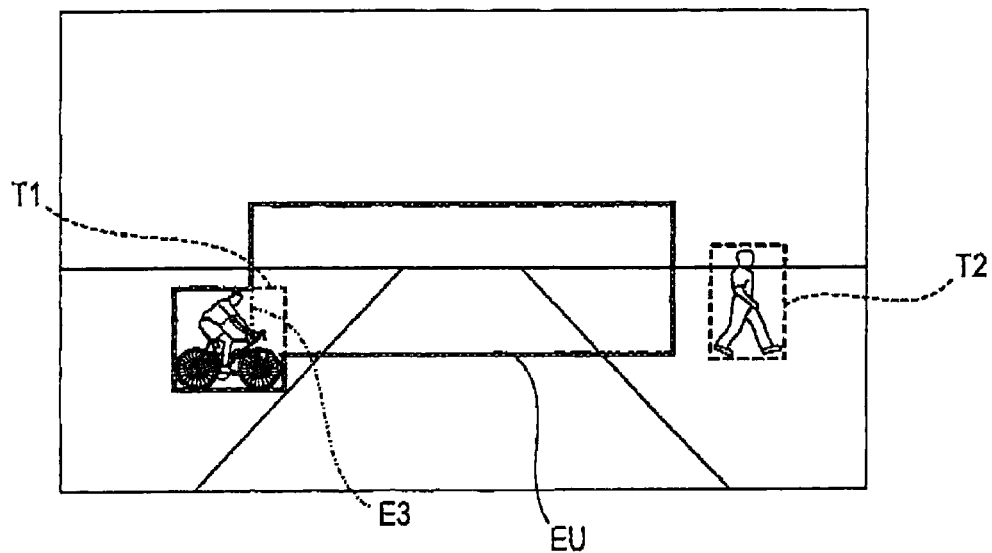
FIG. 8 is a diagram of an exposure area that is expanded to include a partially overlapping target area.

Next, the camera control section 15 judges whether or not a target is present in the exposure area (step S109). Specifically, in an instance in which a target area is present that at least partially overlaps with the exposure area, the camera control section 15 judges that the target is present in the exposure area. For example, in the example in FIG. 8, the target area T1 that partially overlaps with the exposure area E3 is present.

When judged that a target is present in the exposure area (YES at step S109), the camera control section 15 resets the exposure area to an merged area combining the exposure area and the target area that partially overlaps with the exposure area (step S110). In other words, the exposure area is expanded to include the target area. In the example shown in FIG. 8, an exposure area EU that merges the exposure area E3 and the target area T1 is set.

Figure 9:
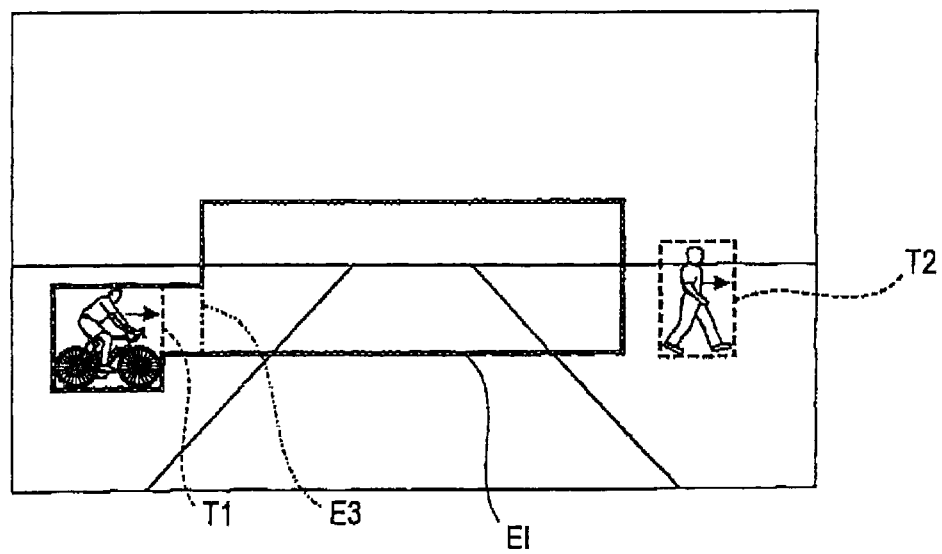
FIG. 9 is a diagram of an exposure area that is expanded to include a target area approaching the exposure area.

On the other hand, when judged that a target is not present in the exposure area (NO at step S109), the camera control section 15 judges whether or not a target is present that does not overlap with the exposure area and is moving in a direction approaching the exposure area (specifically, a center position of the exposure area) (step S111). When judged that a target that is approaching the exposure area is present (YES at step S111), the camera control section 15 resets the exposure area to an inclusive area including the exposure area and the target area approaching the exposure area (step S112). In other words, the exposure area is expanded to include the target area. In the example shown in FIG. 9, an exposure area EI that includes the exposure area E3 and the target area T1 is set. Unlike the exposure area EU (FIG. 8) to which the exposure area is reset at above-described S110, the exposure area EI to which the exposure area is reset at step S112 (FIG. 9) includes a connecting area that connects the original exposure area E3 and the target area T1, in addition to the exposure area E2 and the target area T1.

In this example, to simplify the description, the judgment regarding a target that does not overlap with the exposure area (step S111) is performed when judged that a target is not present in the exposure area (NO at step S109). However, this is not limited thereto. For example, a plurality of targets may be detected. In this instance, targets present in the exposure area, and targets that do not overlap with the exposure area and are approaching the exposure area are both detected. Specifically, for example, an upper limit value (such as three targets) for the number of targets included in the exposure area (involved in the expansion of the exposure area) is set in advance. Targets are selected based on order of priority such as to amount to the upper limit value or less. For example, a target that is within the exposure area and near the center position of the exposure area has first priority. Next, a target that is outside of the exposure area, is approaching the exposure area, and will reach the exposure area at an early timing has second priority. Here, the timing at which the target reaches the exposure area is calculated based on the movement speed at that time. Therefore, even when the target is far from the exposure area, if the target is approaching the exposure area at a high speed, the target may have a higher order of priority than a target present near the exposure area.

When the exposure area is reset at step S110 or S112, the camera control section 15 calculates the average value of the pixel values (luminance values) of all pixels included in the reset exposure area as a control value, in a manner similar to that at above-described step S104 (step S113). However, at step S113, among the pixel values used for calculating the control value (the pixel values of the pixels included in the exposure area), the pixel values of the pixels included in the target area are weighted to have a greater influence on the control value, compared to the pixel values of the pixels that are not included in the target area. Specifically, the weight of the pixel values of the pixels included in the target area is "2". The weight of the pixel values of remaining pixels is "1". The value of the weighted average is calculated as the control value.

Next, the camera control section 15 performs exposure control of the camera 11 based on the control value calculated at S113 (step S114). Subsequently, the camera control section 15 proceeds to S115. When judged at above-described S107 that a target is not identified (NO at step S107) or when judged at above-described S111 that a target that is approaching the exposure area is not present (NO at S111), the camera control section 15 proceeds to step S115.

At step S115, the camera control section 15 calculates a present time Tp and an absent time Ta (step S115). The present time Tp is duration of a state in which a target is present in the captured image. The absent time Ta is duration of a state in which a target is not present in the captured image. The present time Tp and the absent time Ta are measured by a process separate from the exposure control process shown in FIG. 2 and FIG. 3.

Next, the camera control section 15 judges whether or not the present time Tp and the absent time Ta meet a reset condition for resetting the exposure area to a reset state (step S116). Here, the exposure area in the reset state is the exposure area having the maximum size. According to the present embodiment, the exposure area in the reset state is the exposure area E1 shown in FIG. 4. In addition, according to the present embodiment, the reset condition is that the absent time Ta continues for a second time T2 (such as three seconds) after the present time Tp has continued for a first time T1 (such as ten seconds). In other words, the exposure area is assumed to be reset in an instance in which, for example, a vehicle that is traveling at a low speed on a road around which numerous targets are present, such as in an urban area, leaves the urban area and recovers traveling speed. In other words, in an instance in which a state in which a target is present changes to a state in which the target is not present, exposure control can be performed with the exposure area expanded to the maximum size. As a result, the appearance of new targets to be noticed can be handled.

When judged that the present time Tp and the absent time Ta do not meet the reset condition (NO at step S116), the camera control section 15 judges whether or not the traveling speed of the own vehicle meets a reset condition (step S117). According to the present embodiment, the reset condition is that the traveling speed has increased over a predetermined threshold (the traveling speed changes from a state less than the threshold to a state that is the threshold or more). In other words, as described above, the exposure area is assumed to be reset in an instance in which, for example, a vehicle that is traveling at a low speed on a road around which numerous targets are present, such as in an urban area, leaves the urban area and recovers traveling speed.

When judged that the traveling speed does not meet the reset condition (NO at step S117), the camera control section 15 judges whether or not an elapsed time from the start of the exposure control process shown in FIG. 2 and FIG. 3 meets a reset condition (step S118). According to the present embodiment, the reset condition is that a periodic reset timing is reached. The periodic reset timing is not limited to judgment based on the elapsed time. For example, the periodic reset timing may be judged to be reached when the number of images captured reaches a predetermined number.

When judged that the reset conditions are not met at any of steps S116, S117, and S118 (NO at step S118), the camera control section 15 returns to step S101. On the other hand, when judged that a reset condition is met at any of steps S116, S117, and S118 (YES at step S116, YES at step S117, or YES at step S118), the camera control section 15 proceeds to step S119.

At step S119, the camera control section 15 sets (resets) the exposure area to the reset state (step S119). Next, the camera control section 15 calculates a control value for performing exposure control of the camera 11 based on the pixel values of the pixels included in the exposure area set at S119 (step S120). Specifically, the camera control section 15 calculates an average value of the pixel values (luminance values) of all pixels included in the exposure area as the control value, in a manner similar to that at step S104. Next, the camera control section 15 performs exposure control of the camera 11 based on the control value calculated at step S120 (step S121).

The camera control section 15 then judges whether or not the engine of the own vehicle is stopped (step S122). When judged that the engine is not stopped (NO at step S122), the camera control section 15 returns to step S101. On the other hand, when judged that the engine is stopped (YES at step S122), the camera control section 15 ends the exposure control process shown in FIG. 2 and FIG. 3.

The target detected by the exposure control process, such as that described above, is used for vehicle control performed by the vehicle control section 16 (for example, control to reduce collision based on the position of the target). In other words, when there is a likelihood of a collision with a target, the vehicle control section 16 transmits a warning signal to the notifying section 17 to perform notification to the driver. In addition, when the likelihood of a collision with a target is high, the vehicle control section 16 instructs the engine control section 19 to reduce the driving force of the internal combustion engine. In addition, the vehicle control section 16 instructs the brake control section 18 to increase the braking force of the own vehicle.

3. Effects

According to the embodiment that has been described in detail above, the following effects can be achieved.

(1) The camera control section 15 changes the size of the exposure area in the captured image based on the traveling speed, such that the size of the exposure area in the captured image becomes smaller as the traveling speed of the own vehicle increases (step S103). In other words, when the traveling speed is a first speed, compared to when the traveling speed is a second speed that is lower than the first speed, the size of the exposure area in the captured image is set to be smaller.

Figure 10:
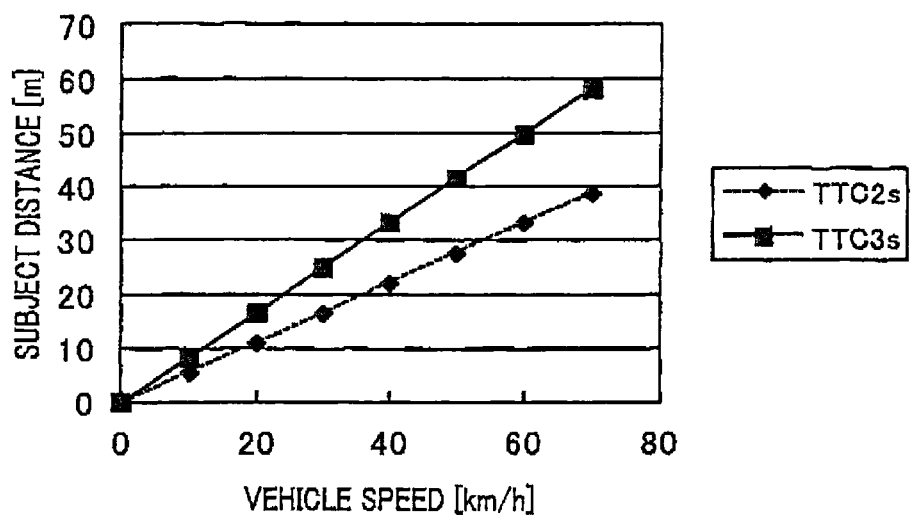
FIG. 10 is a graph of collision margin time TTC.

Therefore, according to the present embodiment, the exposure area can be set to a size suitable for the traveling speed of the own vehicle. In other words, as shown in FIG. 10, with reference to a fixed collision margin time TTC, the distance to a subject obstacle becomes farther as the traveling speed of the own vehicle increases. Therefore, in a situation in which the traveling speed is high, compared to a situation in which the traveling speed is low, importance is required to be placed on the detection of targets at a farther distance. According to the present embodiment, when the traveling speed is high, the exposure area in the captured image is set to be small in size. Therefore, importance can be placed on the detection of targets at a far distance.

(2) The camera control section 15 identifies a target area that is an area in which a target is present in the captured image (step S106). The camera control section 15 weights the pixel values of the pixels included in the target area, among the pixels included in the exposure area, compared to the pixel values of the pixels not included in the target area, such that the influence on the control value is greater (step S113). Therefore, according to the present embodiment, compared to an instance in which the pixel values are not weighted, exposure control that places importance on the imaging state of a target can be actualized.

(3) In an instance in which a target area is present that partially overlaps with the exposure area set based on detection information (travel conditions of the own vehicle), the camera control section 15 expands the exposure area to include the target area (step S110). Therefore, of the target area that partially overlaps with the exposure area, pixel values of pixels included in a portion not overlapping with the exposure area can also be used for calculation of the control value. As a result, according to the present embodiment, compared to an instance in which the exposure area is not expanded, exposure control that places importance on the imaging state of a target can be actualized.

(4) In an instance in which a target area is present that does not overlap with the exposure area set based on detection information (travel conditions of the own vehicle) and is approaching the exposure area, the camera control section 15 expands the exposure area to include the target area (step S112). Therefore, pixel values of pixels included in a target area that does not overlap with the exposure area can also be used for calculation of the control value. As a result, according to the present embodiment, compared to an instance in which the exposure area is not expanded, exposure control that places importance on the imaging state of a target can be actualized.

(5) The camera control section 15 changes the position of the exposure area in the lateral direction in the captured image based on the steering angle (step S103). Therefore, according to the present embodiment, compared to an instance in which the position of the exposure area in the lateral direction in the captured image is fixed regardless of the steering angle, the exposure area can be set in a suitable position based on the steering angle.

(6) The camera control section 15 changes the position of the exposure area in the vertical direction in the captured image based on the pitch angle (step S103). Therefore, according to the present embodiment, compared to an instance in which the position of the exposure area in the vertical direction in the captured image is fixed regardless of the pitch angle, the exposure area can be set in a suitable position based on the pitch angle.

(7) In an instance in which a predetermined reset condition is met, the camera control section 15 resets the size of the exposure area in the captured image to a reset state (step S119). The camera control section 15 then calculates the control value based on the pixel values of the pixels included in the reset exposure area (step S120). Therefore, according to the present embodiment, compared to an instance in which the size of the exposure area in the captured image is not reset to the reset state, tracking of changes in the travel conditions of the own vehicle and the like can be facilitated.

(8) The camera control section 15 uses the following as a reset condition: after a state in which a target is present in the captured image (present time Tp) continues for a first amount of time, a state in which a target is not present in the captured image (absent time Ta) continues for a second amount time (step S116). Therefore, according to the present embodiment, the size of the exposure area can be reset to the reset state when a state in which a target is present changes to a state in which the target is not present. In addition, because continuation of the time is a condition, a phenomenon in which reset frequently occurs in a situation in which a target frequently appears and disappears is unlikely to occur.

(9) The camera control section 15 uses the following as a reset condition: the traveling speed of the own vehicle increases over a predetermined threshold (step S117). Therefore, according to the present embodiment, the size of the exposure area can be reset to the reset state when a state in which the own vehicle should travel at a low speed (such as when a target is present) changes to a state in which the own vehicle can travel at a high speed (such as when no targets are present).

(10) The camera control section 15 uses the following as a reset condition: a periodic timing is reached (step S118). Therefore, according to the present embodiment, a phenomenon in which the size of the exposure area is not reset for a long period of time is unlikely to occur.

According to the present embodiment, the camera control section 15 is equivalent to an example of the exposure control device. Step S101 is equivalent to an example of processing as an image acquiring means. Step S102 is equivalent to an example of processing as a speed acquiring means, a steering angle acquiring means, and a pitch angle acquiring means. Step S103 is equivalent to an example of processing as a setting means. Steps S104, S113, and S120 are equivalent to an example of processing as a calculating means. Step S106 is equivalent to an example of processing as an identifying means. Step S110 is equivalent to an example of processing as a first expanding means. Step S112 is equivalent to an example of processing as a second expanding means. Step S119 is equivalent to an example of processing as a reset means.

4. Other Embodiments

An embodiment of the present invention is described above. However, the present invention is not limited to the above-described embodiment. Various embodiments are possible.

Figure 11:
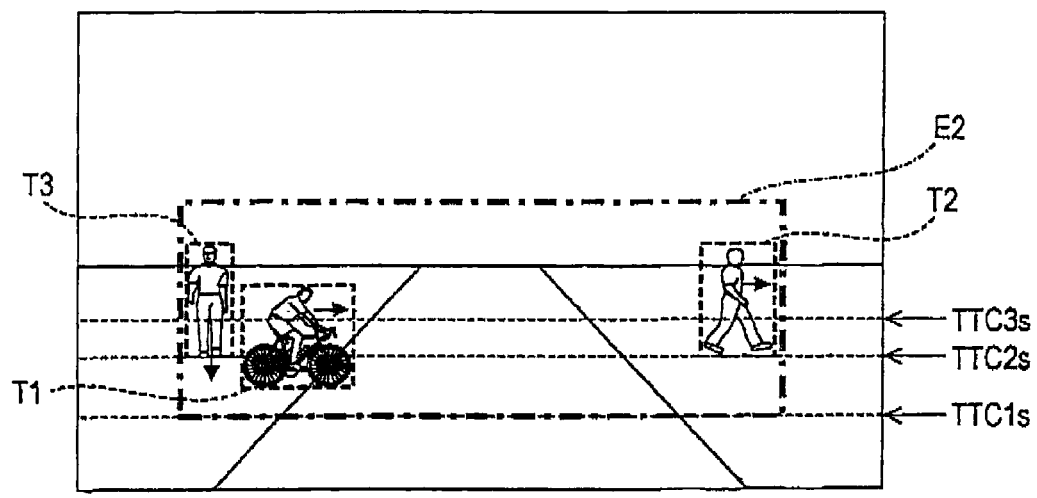
FIG. 11 is a diagram of a selection method for selecting a plurality of targets based on order of priority.

(1) According to the above-described embodiment, a configuration example is described in which a plurality (upper limit value or less) of targets are selected based on order of priority as target areas involved in expansion of the exposure area (target areas partially overlapping with the exposure area or target areas approaching the exposure area). Specifically, an example is described in which a target that is within the exposure area and near the center position of the exposure area has higher priority. A target that is outside of the exposure area, is approaching the exposure area, and will reach the exposure area at an early timing has lower priority. However, such order of priority is merely an example. Other orders of priority may also be used. For example, a target having a short collision margin time TTC may have higher priority. A target that will reach, at an early timing, a position (lower end position) in the exposure area at which the collision margin time TTC is the shortest may have lower priority. A short collision margin time TTC indicates that the distance in the direction ahead of the own vehicle is short, and that the lower end position of the target area is low. In the example in FIG. 11, the target area T1 of which the lower end position is the lowest (the collision margin time TTC is about 1.5 seconds) has the highest priority. Next, of the target areas T2 and T3 of which the lower end positions follow the target area T1 in terms of shortness (the collision margin time TTC is about 2 seconds), the target area T3 that is moving towards the own-vehicle side has the second highest priority.

(2) According to the above-described embodiment, a configuration is given as an example in which the weight of the pixel values of the pixels included in the target area is 2. The weight of the pixel values of remaining pixels is 1. A weighted average is then calculated (step S113). However, the present invention is not limited thereto. For example, the weighting coefficient may be set to other values. In addition, for example, the weight of the pixel values of pixels included in the target area may differ based on the type of target area. Specifically, compared to the pixel values of a target moving in a direction away from the center of the exposure area, the pixel values of a target moving in a direction towards the center of the exposure area may be weighted to have a greater influence on the control value. As a result, exposure control that places importance on the imaging state of a target having a high risk of collision can be actualized.

(3) According to the above-described embodiment, three reset conditions for resetting the exposure area to the reset state are given as examples (Steps S116 to S118). However, the present invention is not limited thereto. For example, one or two of the three reset conditions may be used. Alternatively, a reset condition other than the three reset conditions may be used.

(4) According to the above-described embodiment, the position of the exposure area in the captured image is changed depending on the steering angle and the pitch angle of the own vehicle. However, the present invention is not limited thereto. For example, the shape of the exposure area (such as width and height) may be changed.

(5) According to the above-described embodiment, a rectangular exposure area is given as an example. However, the shape, position, size, and the like of the exposure area are not particularly limited.

(6) According to the above-described embodiment, a configuration in which the pitch angle is detected by the gyro sensor 14 is given as an example. However, the present invention is not limited thereto. For example, the pitch angle may be detected using an acceleration sensor or an inclinometer.

(7) According to the above-described embodiment, notification control, brake control, and engine control are given as examples of vehicle control. However, the present invention is not limited thereto. For example, the steering angle and the like may be controlled. In addition, the vehicle control is not limited to control for reducing collisions and may be other types of control.

(8) According to the above-described embodiment, mobile objects, such as pedestrians, bicycles, motorcycles, and vehicles, are given as examples of the target. However, the present invention is not limited thereto. Other types of targets may be detected.

(9) The constituent elements of the present invention are conceptual and are not limited to the above-described embodiment. For example, a function provided by a single constituent element may be distributed to a plurality of constituent elements. Alternatively, functions provided by a plurality of constituent elements may be integrated in a single constituent element. At least a part of the configuration according to the above-described embodiment may be replaced by a known configuration having similar functions. Moreover, at least a part of the configuration according to the above-described embodiment may, for example, be added to or replace, the configurations in the other embodiments described above.

What is claimed is:

1. A device for controlling exposure of a camera, comprising:
    means for acquiring an image of an area ahead of a vehicle by a camera provided in the vehicle;
    means for acquiring a traveling speed of the vehicle;
    means for setting an exposure area in the acquired image, the exposure area being an area used for exposure control of the camera;
    means for calculating a control value for performing the exposure control of the camera, based on pixel values of pixels included in the exposure area,
    wherein the setting means changes a size of the exposure area in the acquired image based on the traveling speed, such that, when the traveling speed is a first speed, the size of the exposure area in the acquired image is smaller compared to that when the traveling speed is a second speed that is lower than the first speed.

2. The device of claim 1, comprising means for identifying a target area in the acquired image, a target being present in the target area,
    wherein the calculating means includes means for weighting the pixels of the exposure area such that pixels included in the target area which are still included in the exposure area have a larger influence on the control value compared with that of pixels which are outside the target area.

3. The device of claim 2, comprising
    first means for determining whether or not the target area is partially overlapped with the exposure area; and
    first means for expanding the exposure area such that the exposure area includes the target area when the first determining means determines that the target area is partially overlapped with the exposure area.

4. The device of claim 3, comprising
    second means for determining whether or not the target area is overlapped with the exposure area, but moves toward the exposure area; and
    second means for expanding the exposure area such that the exposure area includes the target area when the second determining means determines that the target area is not overlapped with the exposure area, but is moving toward the exposure area.

5. The device of claim 4, comprising
    means for acquiring a steering angle of the vehicle,
    wherein the setting means includes means for changing a lateral position of the exposure area in the acquired image depending on the acquired steering angle.

6. The device of claim 5, comprising
    means for acquiring a pitch angle of the vehicle,
    wherein the setting means includes means for changing a vertical position of the exposure area in the acquired image depending on the acquired pitch angle.

7. The device of claim 6, comprising
    third means for determining whether or not a reset condition predetermined for a size of the exposure area in the acquired image is met; and
    means for resetting the size of the exposure area into a so predetermined initial size of the exposure area,
    wherein the calculating means calculates the control value based on values of pixels included in the exposure area which has been reset.

8. The device of claim 2, comprising
    second means for determining whether or not the target area is overlapped with the exposure area, but moves toward the exposure area; and
    second means for expanding the exposure area such that the exposure area includes the target area when the second determining means determines that the target area is not overlapped with the exposure area, but is moving toward the exposure area.

9. The device of claim 8, comprising
    means for acquiring a steering angle of the vehicle,
    wherein the setting means includes means for changing a lateral position of the exposure area in the acquired image depending on the acquired steering angle.

10. The device of claim 9, comprising
    means for acquiring a pitch angle of the vehicle,
    wherein the setting means includes means for changing a vertical position of the exposure area in the acquired image depending on the acquired pitch angle.

11. The device of claim 10, comprising
    third means for determining whether or not a reset condition predetermined for a size of the exposure area in the acquired image is met; and
    means for resetting the size of the exposure area into a predetermined initial size of the exposure area,
    wherein the calculating means calculates the control value based on values of pixels included in the exposure area which has been reset.

12. The device of claim 1, comprising
    means for acquiring a steering angle of the vehicle,
    wherein the setting means includes means for changing a lateral position of the exposure area in the acquired image depending on the acquired steering angle.

13. The device of claim 1, comprising
    means for acquiring a pitch angle of the vehicle,
    wherein the setting means includes means for changing a vertical position of the exposure area in the acquired image depending on the acquired pitch angle.

14. The device of claim 1, comprising
third means for determining whether or not a reset condition predetermined for a size of the exposure area in the acquired image is met; and
means for resetting the size of the exposure area into a predetermined initial size of the exposure area,
wherein the calculating means calculates the control value based on values of pixels included in the exposure area which has been reset.

15. The device of claim 14, wherein
the reset condition is defined as a condition that a first period of time during a target is present in the acquired image lasts, and then a second period of time a target is not present in the acquired image lasts.

16. The device of claim 14, wherein
the reset condition is defined as a condition that the traveling speed of the vehicle increases to cross a given threshold thereof.

17. The device of claim 14, wherein
the reset condition is defined as a condition that time advances to regularly set reset timing after start of the exposure control.

18. A method of controlling exposure of a camera, comprising steps of:
acquiring an image of an area ahead of a vehicle by a camera provided in the vehicle;
acquiring a traveling speed of the vehicle;
setting an exposure area in the acquired image, the exposure area being an area used for exposure control of the camera; and
calculating a control value for performing the exposure control of the camera, based on pixel values of pixels included in the exposure area,
wherein the setting step changes a size of the exposure area in the acquired image based on the traveling speed, such that, when the traveling speed is a first speed, the size of the exposure area in the acquired image is smaller compared to that when the traveling speed is a second speed that is lower than the first speed.

* * * * *

UNITED STATES PATENT AND TRADEMARK OFFICE
CERTIFICATE OF CORRECTION

PATENT NO. : 9,060,135 B2  
APPLICATION NO. : 14/160907  
DATED : June 16, 2015  
INVENTOR(S) : Akiba Page 1 of 1

It is certified that error appears in the above-identified patent and that said Letters Patent is hereby corrected as shown below:

In the claims
Column 14, claim 7, line 25, after "a" delete "so".

Signed and Sealed this
Third Day of May, 2016

Michelle K. Lee
*Director of the United States Patent and Trademark Office*